(No Model.)

G. H. SMITH.
SAFETY PIN.

No. 305,974. Patented Sept. 30, 1884.

WITNESSES:
C. H. Leuther Jr
Chas F. Schmidt

INVENTOR:
George H. Smith
by Joseph A. Miller &co
Atty

UNITED STATES PATENT OFFICE.

GEORGE H. SMITH, OF PROVIDENCE, RHODE ISLAND.

SAFETY-PIN.

SPECIFICATION forming part of Letters Patent No. 305,974, dated September 30, 1884.

Application filed June 9, 1883. (No model.)

*To all whom it may concern:*

Be it known that I, GEORGE H. SMITH, of the city and county of Providence, State of Rhode Island, have invented a new and useful Improvement in Safety-Pins; and I hereby declare the following to be a full, clear, and exact description of the same, reference being had to the accompanying drawings, forming part of this specification.

This invention relates to devices for securing ornaments or other objects to garments; and it consists in the provision of a peculiarly-bent pin having a single point and so curved at the end opposite the point as to bind the fabric, and at the same time pass completely within or beneath the substance of the fabric, from which the pin cannot be violently or accidentally detached.

Figure 1:
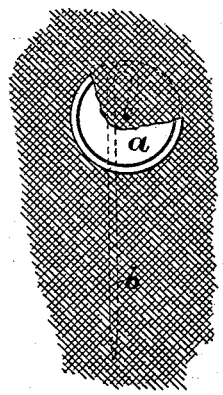
Figure 2:
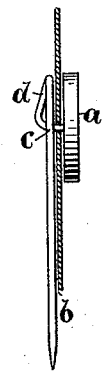
Figure 4:
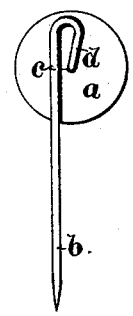
Figure 3:
Figure 5:
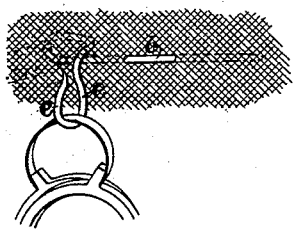

Figure 1 is a partial view of an ornament-head secured to a scarf or garment, showing the pin inserted into the same. Fig. 2 is a side view of the pin and ornament-head, showing the peculiar bend in the pin. Fig. 3 is a top view of the pin and ornament-head. Fig. 4 is a rear view of the same. Fig. 5 is a view of a safety-pin, one end of which is formed into a hook.

In the drawings, $a$ is the ornament-head, which may be of any desired form or design. This pin extends from the ornament-head, or the hook $e$, rearward beyond the vertical line of the pin proper, forming the post $c$, and then upward and toward the ornament-head, forming the arm $d$, thence downward, forming the pin proper, $b$, so that when secured the pin $b$ compresses the material between the pin and the ornament-head or the hook, and the pin cannot be displaced by any ordinary strain on the pin, the ornament-head, or the hook, the same being firmly held by the post $c$, inserted in the material, and can only be removed by forcing the material by the pin off from the post $c$ and up the arm $d$, when the pin may be withdrawn.

The essential feature which makes this pin a safety-pin is the extension of the post $c$ beyond the inner face or edge of the pin $b$. The farther this post extends the more can the material be compressed and the more securely is the pin held.

The portion of the wire connecting the post $c$ with the pin $b$ may be bent into various forms. It may be bent helically around the post and end in the pin $b$ nearer the ornament-head than the end of the post $c$, or bent in any other shape in which the pin, when inserted, will prevent the post $c$ from moving outward sufficiently to allow the arm $d$ to pass through the hole in the material, and thereby allow the pin to be accidentally displaced.

The construction is so simple and the practical value so obvious that its merits can be appreciated by an examination of Fig. 2, which clearly shows that the pin cannot be accidentally lost.

From an examination of Fig. 5 of the drawings it will be seen that when the pin is properly embedded in the fabric its bent or curved end is completely concealed in or beneath the fabric, and that only the hook or ornament is exposed. It will be further seen that a direct pull upon the exposed end of the pin will not detach it from the fabric; neither will a lateral pull do so.

In order to remove the pin it must be carefully drawn out in such manner as to pass the several bends successively through the aperture out of which the end of the pin protrudes.

Having thus described my invention, I claim as new and desire to secure by Letters Patent—

1. The pin $b$, pointed at one end, and formed at the opposite end with the arm $d$ and post, arranged substantially as and for the purposes set forth.

2. The combination, with the hook or ornament-head, of the pin $b$, pointed at one end, and formed at the opposite end with the arm $d$, and the post $c$, substantially as and for the purposes set forth.

GEO. H. SMITH.

Witnesses:
J. A. MILLER, Jr.,
C. H. LUTHER, Jr.